US011916796B2

United States Patent
Iyer et al.

(10) Patent No.: US 11,916,796 B2
(45) Date of Patent: Feb. 27, 2024

(54) END-TO-END DATA PACKETS FLOW CONTROL THROUGH AN OVERLAY ENVIRONMENT OF A WIDE AREA NETWORK

(71) Applicant: Versa Networks, Inc., San Jose, CA (US)

(72) Inventors: Jayakrishnan Iyer, Morgan Hill, CA (US); Chetan Bali, Milpitas, CA (US); Vignesh Chinnakkannu, Gilroy, CA (US); Ananda Sathyanarayana, Cupertino, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/561,462

(22) Filed: Dec. 23, 2021

(65) Prior Publication Data
US 2023/0208769 A1    Jun. 29, 2023

(51) Int. Cl.
*H04L 47/2483* (2022.01)
*H04L 45/64* (2022.01)
*H04L 47/2491* (2022.01)
*H04L 47/2441* (2022.01)

(52) U.S. Cl.
CPC .......... *H04L 47/2483* (2013.01); *H04L 45/64* (2013.01); *H04L 47/2441* (2013.01); *H04L 47/2491* (2013.01)

(58) Field of Classification Search
CPC ....................................................... H04L 45/65
See application file for complete search history.

(56) References Cited

U.S. PATENT DOCUMENTS

| | | | | |
|---|---|---|---|---|
| 9,632,823 | B1* | 4/2017 | Allen | G06F 11/3452 |
| 10,511,514 | B1* | 12/2019 | Vytla | H04L 43/0852 |
| 2016/0330075 | A1* | 11/2016 | Tiwari | H04L 41/0806 |
| 2016/0353461 | A1* | 12/2016 | Vachuska | H04L 45/64 |
| 2017/0337074 | A1* | 11/2017 | Tsirkin | G06F 9/45558 |
| 2018/0367406 | A1* | 12/2018 | Prabhu | H04L 47/20 |
| 2019/0199636 | A1* | 6/2019 | Narayanan | H04L 47/125 |
| 2020/0205025 | A1* | 6/2020 | Saha | H04L 47/24 |
| 2020/0304411 | A1* | 9/2020 | Tang | H04L 47/122 |

* cited by examiner

*Primary Examiner* — Benjamin Lamont
(74) *Attorney, Agent, or Firm* — Loza & Loza, LLP (57) ABSTRACT

End-to-end data packet flow control is described for an overlay environment of a wide area network. A method includes detecting an active session of a specific application with a source node and a destination node within an overlay environment, detecting a traffic flow from the source node to the destination node associated with the active session, mapping the traffic flow to a dedicated service processing thread of a network services appliance, mapping an identifier to the dedicated service processing thread, and forwarding the traffic flow to the destination node through the dedicated service processing thread by applying the identifier to the traffic flow.

20 Claims, 9 Drawing Sheets

END-TO-END DATA PACKETS FLOW CONTROL THROUGH AN OVERLAY ENVIRONMENT OF A WIDE AREA NETWORK

TECHNICAL FIELD

The embodiments herein relate to end-to-end data packet flow control through an overlay environment of a wide area network and, in particular to anchoring the flow for a particular application.

BACKGROUND

An overlay environment allows edge nodes to route packets to other edge nodes through a wide area network. The overlay environment is built on top of an existing network infrastructure whether a public infrastructure like the Internet or a private network. The edge nodes encapsulate one or more data packets in a wrapper to send packets through a virtual tunnel created in the public or private network. The wrapper has a header to ensure that the encapsulated packet reaches the intended destination edge node.

Network data communications may rely on virtualized resources to carry the data. A VNF (Virtual Network Function) may take the place of a hardware router. A Software-Defined Wide Area Network (SD-WAN) may take the place of dedicated physical network resources. An SD-WAN may be configured to connect one or more end nodes, end users, and local area networks (LANs) to a branch. At least one designated hub is connected to each of the branches. The hubs are able to act as gateways to a plurality of branches. The branches themselves may have direct access to the Internet through one or more wide area network (WAN) links as well as through the hubs.

A network appliance (NA) may be physical or virtualized, for example as a virtualized network function (VNF) and used to process packets using each packet's 4-tuple or 5-tuple. A typical 5-tuple is a packet header that includes a source internet protocol address (src-ip), a destination internet protocol address (dst-ip), a protocol (proto), a source port (src-port) and a destination port (dst-port) and may be designated using the notation <src-ip, dst-ip, proto, src-port, dst-port>. Using this information, an NA is able to perform service plane processing including Network Address Translation (NAT), Next Gen Fire Wall (NGFW), and Unified Threat Management (UTM). When service plane processing is performed in parallel with a NA with multiple processing engines or threads, a technique is required to distribute the service plane traffic flow between the processing engines or threads.

In some software-based NAs, a software forwarding-based architecture is used to distribute and perform service plane processing without any overlay involvement. Sessions are distributed across the processing engines and threads by calculating a hash (e.g., a cyclic redundancy code (CRC) or Four-Byte Key (FBK)) of the flow 5-tuple. A flow distribution thread (also referred to as a poller) uses this hash to distribute the incoming flow onto the service processing threads (also referred to as workers). The flow distribution thread identifies each thread with an identifier, referred to as tID herein, and uses logic like the following: D_tID=H mod N threads. Here, D_tID is the target service processing thread or worker identifier, H is the 5-tuple hash and N threads are the total number of service processing threads. This logic evenly distributes incoming packets among the threads and keeps packets with the same hash together

SUMMARY

Embodiments herein relate to end-to-end data packet flow control through an overlay environment of a wide area network. Some embodiments relate to a method that includes detecting an active session of a specific application with a source node and a destination node within an overlay environment, detecting a traffic flow from the source node to the destination node associated with the active session, mapping the traffic flow to a dedicated service processing thread of a network services appliance, mapping an identifier to the dedicated service processing thread, and forwarding the traffic flow to the destination node through the dedicated service processing thread by applying the identifier to the traffic flow.

Some embodiments include sending the identifier to the destination node and receiving the identifier from the destination node before forwarding the traffic flow. Some embodiments include attaching the identifier to the traffic flow before forwarding the traffic flow to the destination node.

In some embodiments, the identifier includes a Core Class value of a generic protocol extension of a header. In some embodiments, the overlay environment is a software-defined wide area network (SD-WAN), wherein the traffic flow is encapsulated with a generic protocol extension for the SD-WAN, and wherein the identifier is in the generic protocol extension. In some embodiments, forwarding the traffic flow is performed after receiving the identifier from the destination node. In some embodiments, the generic protocol extension includes the identifier sent to the destination node and the identifier received from the destination node.

In some embodiments, the destination node is a remote branch. In some embodiments, sending the identifier is performed at a source branch. In some embodiments, the specific application is a voice application and the traffic flow comprises audio packets.

Some embodiments include converging the traffic flow to a learnt state between the source node and the destination node. In some embodiments, converging the traffic flow comprises pinning the traffic flow in an overlay.

Another example relates to a non-transitory computer-readable storage medium containing program instructions, wherein execution of the program instructions by the computer causes the computer to perform operations that include detecting an active session of a specific application with a source node and a destination node within an overlay environment, detecting a traffic flow from the source node to the destination node associated with the active session, mapping the traffic flow to a dedicated service processing thread of a network services appliance, mapping an identifier to the dedicated service processing thread, and forwarding the traffic flow to the destination node through the dedicated service processing thread by applying the identifier to the traffic flow.

14. Some embodiments include sending the identifier to the destination node and receiving the identifier from the destination node before forwarding the traffic flow. In some embodiments, the identifier includes a quality of service class. In some embodiments, the quality of service class is in the form of a Core Class and wherein the identifier is in a form of a 2-tuple. In some embodiments, the 2-tuple is sent within a wrapper of an encapsulated traffic flow.

In another example, an apparatus includes a configuration monitor to detect an active session of a specific application with a source node and a destination node within an overlay environment, a control interface to detect a traffic flow from the source node to the destination node associated with the active session, an anchor state machine to map the traffic flow to a dedicated service processing thread of a network services appliance, and to map an identifier to the dedicated service processing thread, and a communications interface to forward the traffic flow to the destination node through the dedicated service processing thread by applying the identifier to the traffic flow.

In some embodiments, the apparatus is a source branch of a software-defined wide area network and the destination node is a remote branch of the software-defined wide area network. In some embodiments, the traffic flow is encapsulated with a generic protocol extension for the software-defined wide area network, and wherein the identifier is in the generic protocol extension.

BRIEF DESCRIPTION OF THE FIGURES

The embodiments herein will be better understood from the following detailed description with reference to the drawing figures, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In an overlay environment, such as SD-WAN or Internet Protocol Security (IPSec) Virtual Private Network (VPN), the inner packet and consequently the inner 5-tuple information is obscured due to the encapsulated, secure, or encrypted nature of the environment. This obscurity makes it difficult to ensure uniform distribution of flows across the overlay environment.

In an SD-WAN, it is possible that for certain types of non-client-to-server (C2S) traffic flows such as bidirectional probing, other stateless traffic flows, etc., a different session state could be created independently on both SD-WAN endpoints. This could lead to traffic for the given flows being punted across different service processing threads resulting in inefficient processing on each appliance. There is no clear way to assign flows from a given application to service processing threads end-to-end in an overlay environment such as SD-WAN. This makes it particularly difficult to provide Service Level Agreement (SLA) guarantees for applications such as voice.

In some systems, flows are assigned to service processing threads using a generic hash of the 5-tuple. The assignments cause an uneven distribution of flows resulting in overutilization of certain service processing threads and consequently underutilization of the rest. As described herein, identifiers are used to pin the traffic flow between two endpoints for a particular application. The two communicating endpoints then converge to a learnt state after the traffic flow has been learnt at both endpoints. A flow anchor exchange is used to converge to the learnt state as described below.

Packet flow for a session or application through an SD-WAN may be improved by pinning an application to a particular packet processing thread or engine, which is sometimes referred to as a worker thread or service processing thread, using a core-class message. In some embodiments, four new Core Class designations (e.g., CC4, CC5, CC6, CC7) are used. The end-to-end pinning may be configured to provide performance-sensitive application traffic control knobs to isolate any particular application traffic.

In addition to application pinning, packet flow for a session or application through an SD-WAN overlay may be further improved using end-to-end flow anchoring. Flow anchoring may provide an additional level of determinism for end-to-end performance of applications running on an SD-WAN overlay. The deterministic performance may reduce latency, loss, jitter, and other effects through the network.

Latency and jitter are particularly important with audio and video applications. One such application is Session Initiation Protocol (SIP), an application-layer control (signaling) protocol for sessions. The sessions may include Internet telephone calls, multimedia distribution, and multimedia conferences. SIP can create, modify, and terminate sessions with one or more participants.

Figure 1:
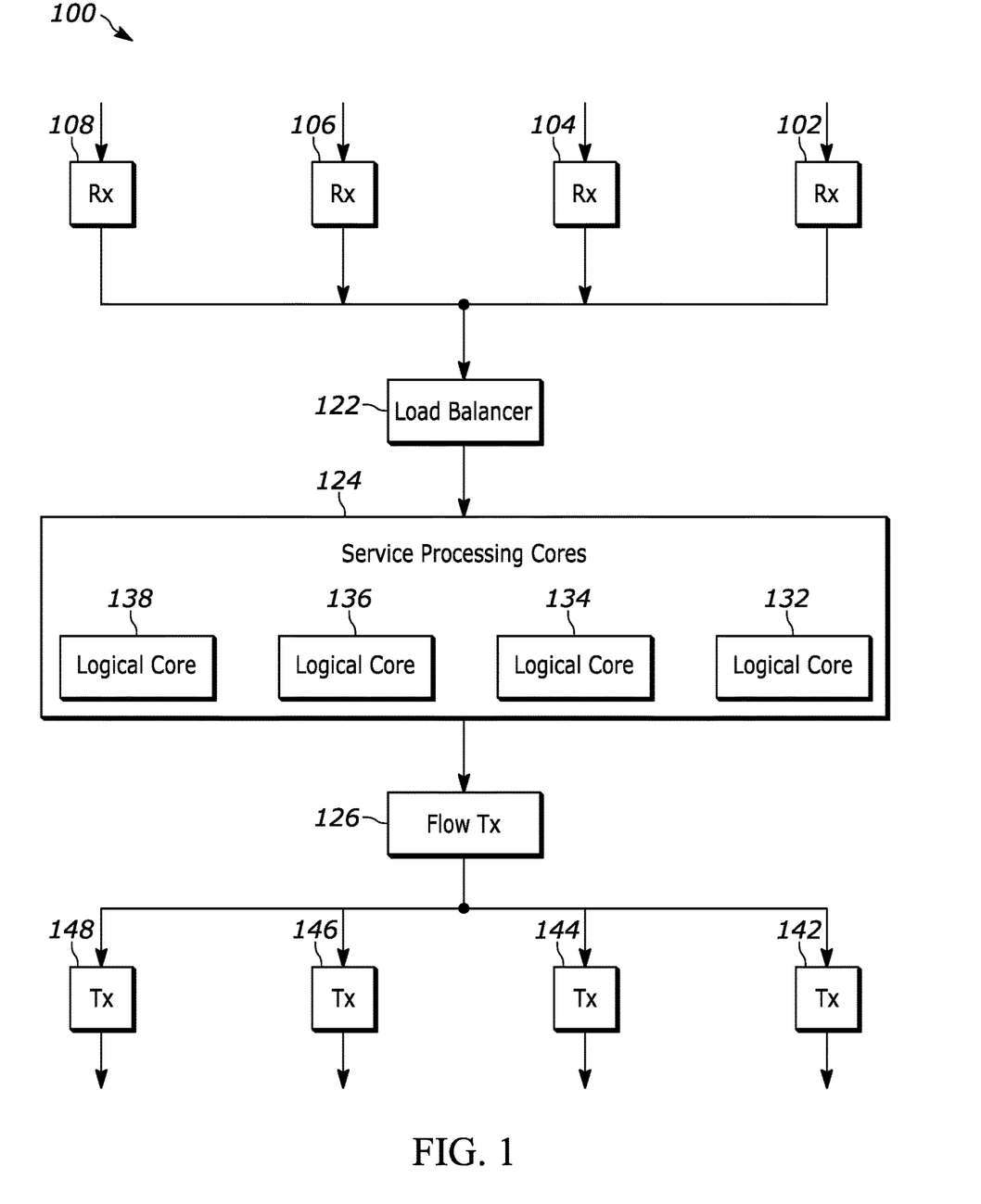
FIG. 1 is a block diagram of a forwarding architecture illustrating an example topology used to illustrate the methods disclosed herein.

FIG. 1 is a block diagram of a software-based forwarding architecture 100, such as that of a branch in an SD-WAN topology. The architecture 100 may also apply to a hub or other node and may also apply to other WAN technologies. Multiple receiving ports 102, 104, 106, 108 each receive packets from clients (not shown) to be forwarded to one or more remote destination nodes (not shown) through transmitting ports 142, 144, 146, 148. Each receiving port and each transmitting port may be implemented as a network interface card (NIC), however any interface to the SD-WAN or other overlay environment may be used and may be based in hardware, firmware, or software. The connections of the ports may be wired or wireless. Any sending or destination node (not shown) coupled to any of the ports may be an end node, a branch, a hub, a controller, or other node in the SD-WAN.

The receiving ports 102, 104, 106, 108 are each coupled to one or more send load balancers 122, pollers, or distribution threads and the transmitting ports 142, 144, 146, 148 are each coupled to one or more flow transmitters 126, pollers, or distribution threads. The illustrated architecture shows transmission in only one direction but the illustrated configuration may be made reciprocal so that the transmitting ports may also serve as receiving ports and the receiving ports may also serve as transmitting ports for other packets.

A service processing core 124 is coupled between the load balancer 122 and the flow transmitter 126. The service processing core has multiple workers 132, 134, 136, 138. The workers are identified as associated with logical cores for reference purposes, however each worker may represent one or more service processing threads or cores, as may be suitable to any particular hardware and software configuration. The workers 32, 134, 136, 138 may perform any of a variety of different network processing services. These may include routing, carrier-grade network address translation (CGNAT), Internet Protocol Security (IPSec), stateful firewall, next generation firewall, and other services, including those other services mentioned herein. A particular worker may be optimized for a particular service or workers may be assigned to different services based on need, supply, suitability, or QoS. The workers may use additional external resources (not shown) to provide the services. The load balancer and flow transmitter are flow distribution threads that may use the same or different hardware resources of the forwarding architecture.

The load balancer 122 receives packets from the receiving ports 102, 104, 106, 108 or connectors and distributes the packets to the workers 130, 132, 134, 136, 138 using header and workflow information. The flow transmitter 126 receives the packets from the workers 130, 132, 134, 136, 138 and forwards the packets to the respective transmitting ports 142, 144, 146, 148 or connectors. The flow transmitter 126 may be used to manage Quality of Service (QOS). This is particularly appropriate for configurations in which QoS is not supported by the network interface card. This may also be done at one of the workers or threads of the service processing core 124.

Figure 2:
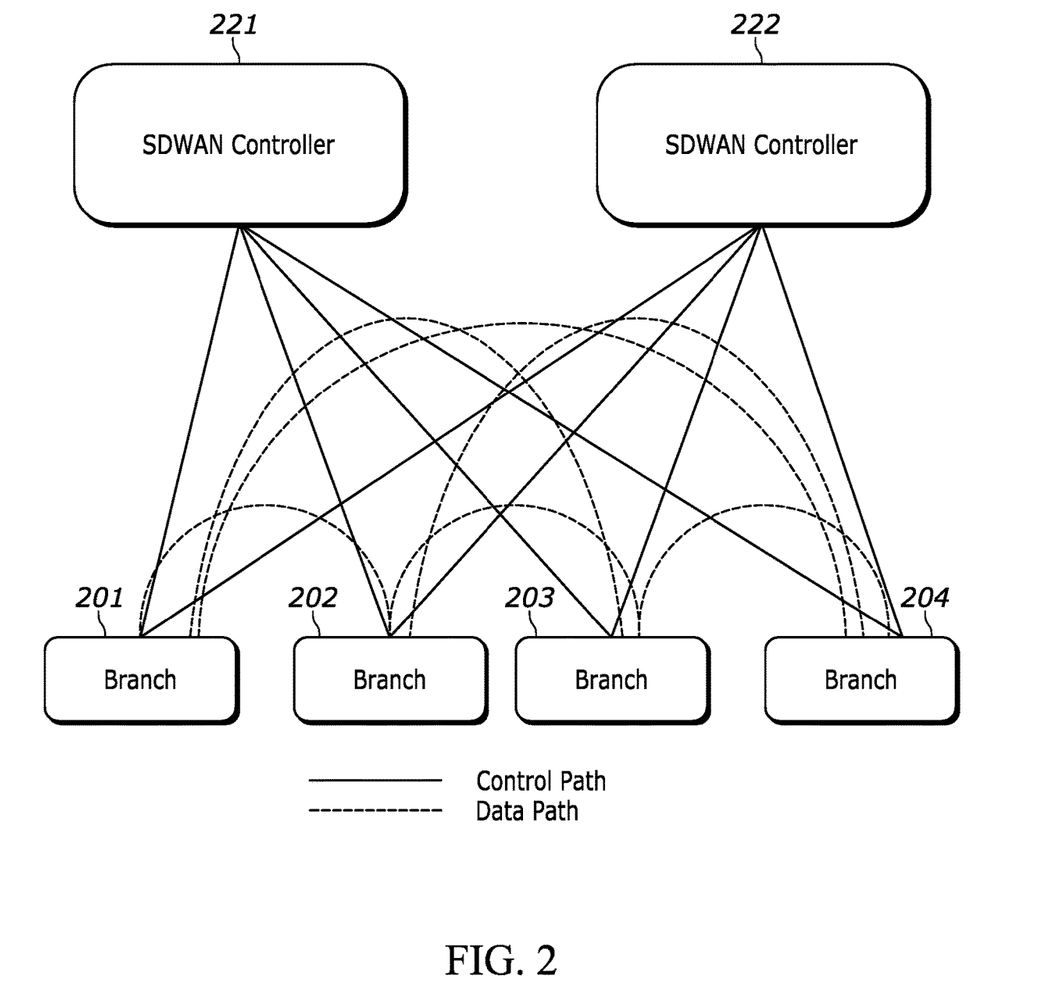
FIG. 2 is a diagram of an SD-WAN deployment topology with a full mesh suitable for embodiments herein.

FIG. 2 is a diagram of a full mesh SD-WAN deployment topology suitable for use with the branch of FIG. 1. The topology includes a first branch 201, a second branch 202, a third branch 203, and a fourth branch 204. The branches each have data paths to each other branch. The topology also includes a first controller 221 and a second controller 222. The controllers are each able to communicate with each branch through a control path. This is a full mesh topology. In alternative configurations, some branches are able to communicate only with some of the other branches and some branches may be able to communicate with only some of the controllers. The branches connect to end nodes through a LAN or other WAN not shown here for simplicity.

Figure 3:
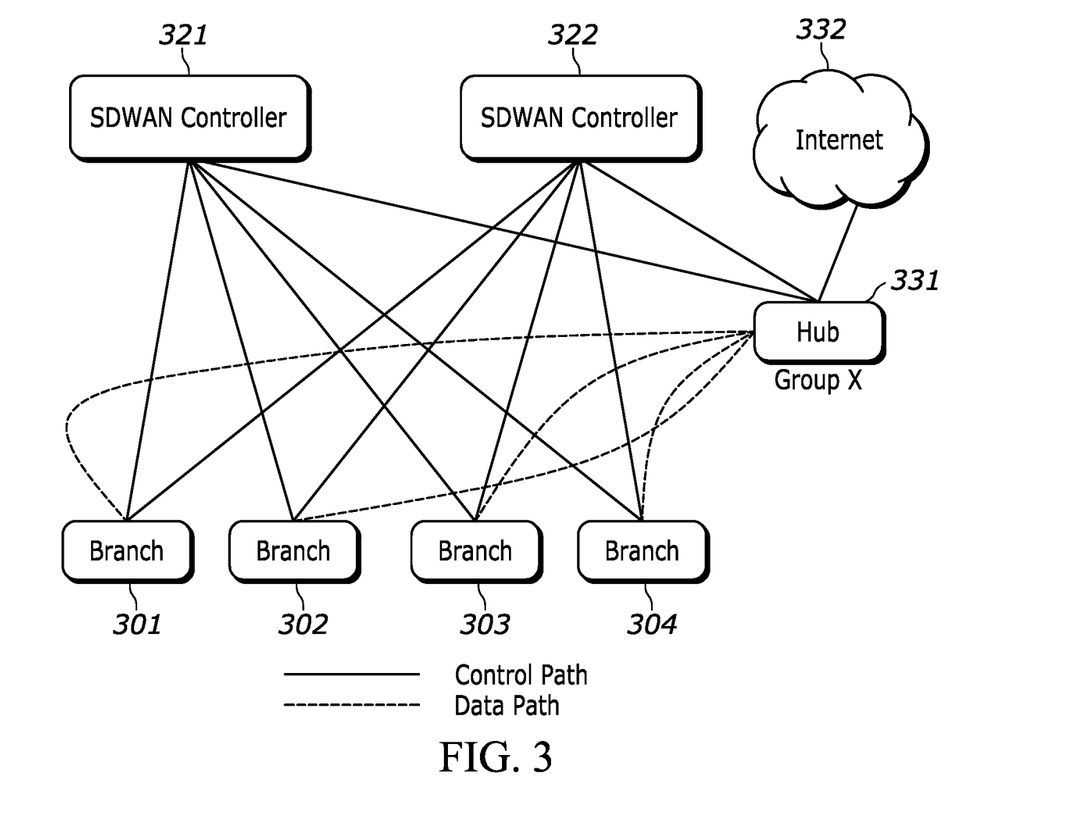
FIG. 3 is a diagram of an SD-WAN deployment topology with hub and spoke suitable for embodiments herein.

FIG. 3 is a diagram of a hub and spoke SD-WAN deployment topology suitable for use with the branch of FIG. 1. The topology includes a first branch 301, a second branch 302, a third branch 303, and a fourth branch 204. The branches each have data paths to a hub 331. The hub supports a connection to external networks through the Internet 332 or another network. The topology also includes a first controller 321 and a second controller 322. The controllers are each able to communicate with each branch and with the hub through a control path. The branches communicate with each other through the hub. The branches connect to end nodes through a LAN or other WAN not shown here for simplicity.

Figure 4:
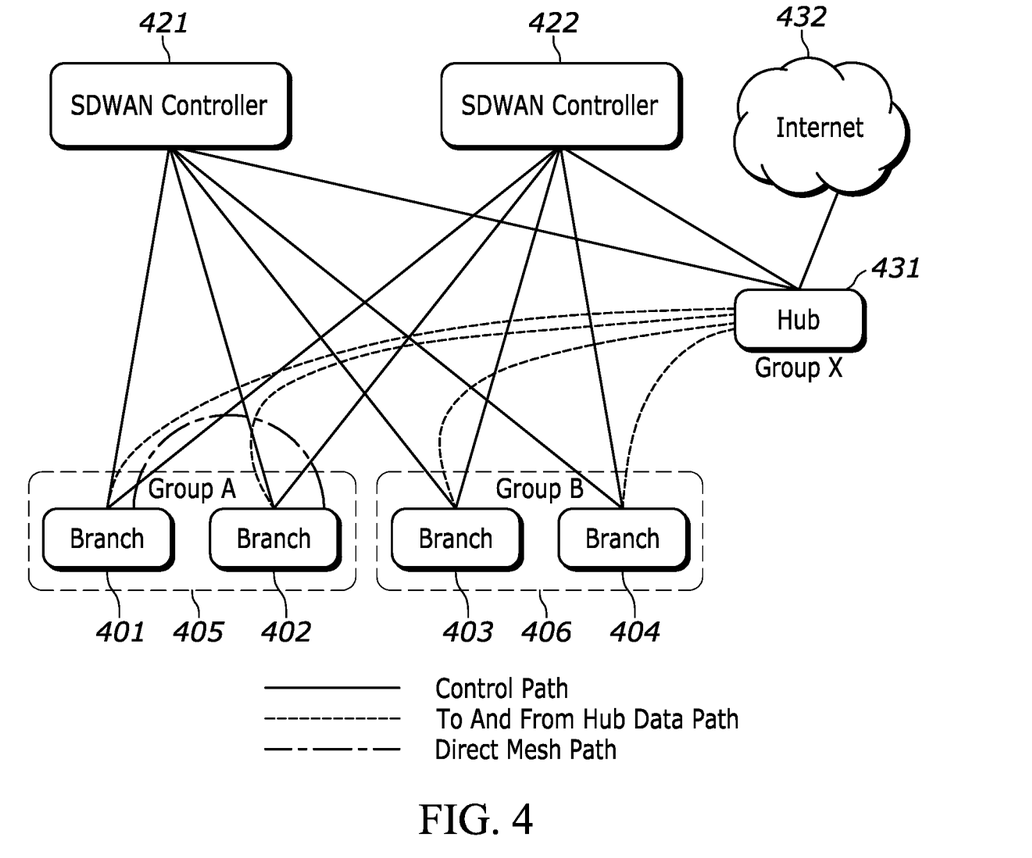
FIG. 4 is a diagram of an SD-WAN deployment topology with a partial mesh and hub suitable for embodiments herein.

FIG. 4 is a diagram of a partial mesh SD-WAN deployment topology with a hub suitable for use with the branch of FIG. 1. The topology includes a first branch 401, a second branch 402, a third branch 403, and a fourth branch 204. The first branch 401 and the second branch 402 are in a group A 405 and are able to communicate with each other through a direct mesh path. The third branch 403 and the fourth branch 404 are in a group B 406 that is not configured to allow the branches to communicate with each other through a direct mesh path. The branches each have data paths to a hub 431. The hub supports a connection to external networks through the Internet 432 or another network. The topology also includes a first controller 421 and a second controller 422. The controllers are each able to communicate with each branch and with the hub through a control path. The branches communicate with each other through the hub. The branches connect to end nodes through a LAN or other WAN not shown here for simplicity.

Figure 5:
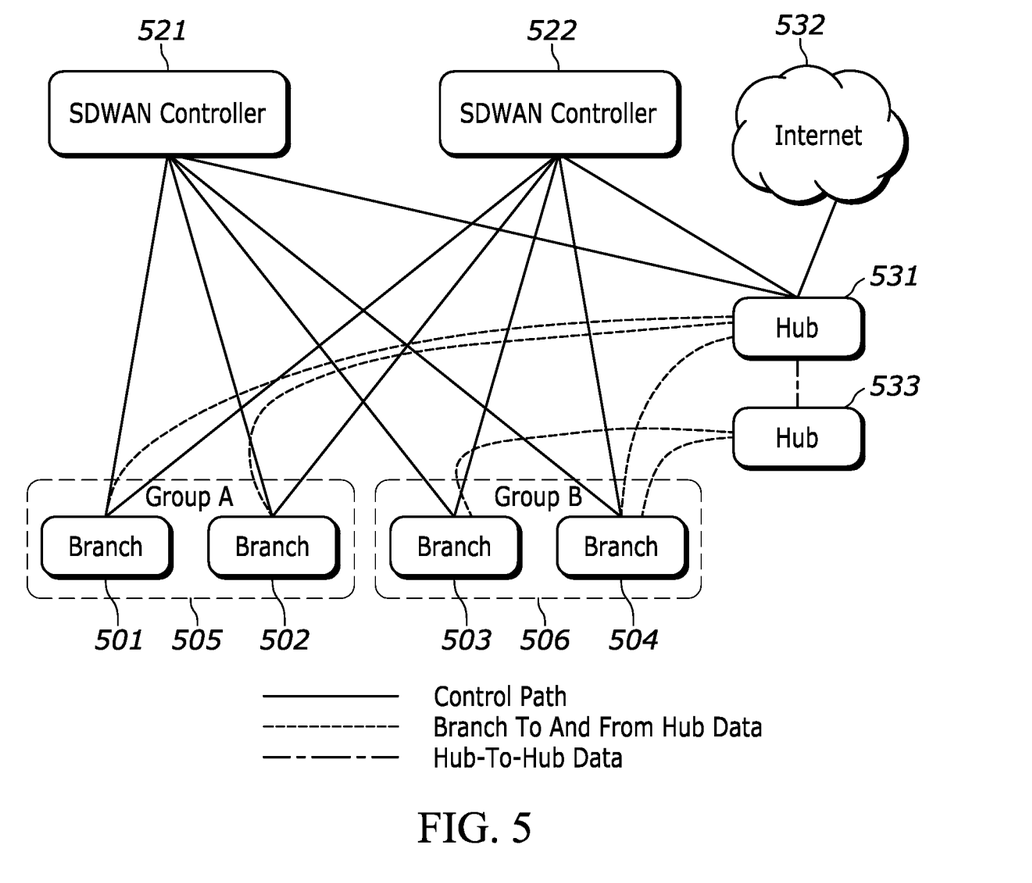
FIG. 5 is a diagram of an SD-WAN deployment topology with spoke-hub-hub-spoke suitable for embodiments herein.

FIG. 5 is a diagram of an SD-WAN deployment topology suitable for use with the branch of FIG. 1. This is a spoke-hub-hub-spoke topology. The topology includes a first branch 501, a second branch 502, a third branch 503, and a fourth branch 204. The first branch 501 and the second branch 502 are in a group A 505 and the third branch 503 and the fourth branch 504 are in a group B 506. The branches each have data paths to a hub. A first hub 531 has a data path to each of the branches including those in group A 505 and those in group B 506. A second hub 533 has a data path only to the branches of group B 506. There is also a hub-to-hub data path to communicate data between the two hubs. One or both of the hubs is connected to the Internet 532 or another network. The topology also includes a first controller 521 and a second controller 522. The controllers are each able to communicate with each branch and with the hubs through a control path. The branches communicate with each other through the hub. The branches connect to end nodes through a LAN or other WAN not shown here for simplicity.

Flows going over an SD-WAN overlay may be pinned to a specific worker or thread for processing some specific application traffic. The specific thread may be determined by the user, by a controller, or by a branch or hub or by a scheduler at any level. Flows may be pinned together to any particular thread as a group. A new terminology of "core-class" is introduced which allows for mapping a "service plane processing core," e.g., a worker in FIG. 1, to a "default traffic class" or "user-defined traffic class". This mechanism isolates latency and jitter-sensitive traffic, for example voice traffic, to a specific service processing thread. The same mechanism may be used over multiple hops in the overlay.

Quality of service (QOS) in any system supports four traffic classes with strict priorities. These are used for classifying applications in default settings. The traffic class is a parameter that is defined with values from 0 to 3 in the order of priority from highest to lowest as in Table 1.

TABLE 1

| TC Parameter Value | Priority |
| --- | --- |
| Traffic Class 0 | Network Control |
| Traffic Class 1 | Expedited Forwarding |

TABLE 1-continued

| TC Parameter Value | Priority |
| --- | --- |
| Traffic Class 2 | Assured Forwarding |
| Traffic Class 3 | Best Effort |

Core-class is a parameter which specifies which applications (or traffic classes) need to be processed in a set of service processing threads. Eight Core Classes are defined below to classify and pin applications end-to-end. The first four Core Classes from 0 to 3 are directly integrated in the QoS system, each as a quality of service class, and their mappings are defined as shown in Table 2.

TABLE 2

| CC Parameter Value | Corresponding Traffic Class |
| --- | --- |
| Core Class 0 (CC0) | Traffic Class 0 |
| Core Class 1 (CC1) | Traffic Class 1 |
| Core Class 2 (CC2) | Traffic Class 2 |
| Core Class 3 (CC3) | Traffic Class 3 |

Core Classes 4 to 7 are not used by default and may be used to dedicate a specified worker thread of a data plane core to a specific application which may not fall within the purview of the default core classes 0 to 3. Their mappings may be indicated as shown in Table 3 or in any suitable way.

TABLE 3

| CC Parameter Value | Corresponding Worker Thread |
| --- | --- |
| Core Class 4 (CC4) | Traffic Worker Thread 0 |
| Core Class 5 (CC5) | Traffic Worker Thread 1 |
| Core Class 6 (CC6) | Traffic Worker Thread 2 |
| Core Class 7 (CC7) | Traffic Worker Thread 3 |

Consider an example. Assume a system with service processing threads having a thread identification tID from 1 to n {tID_1, tID_2, . . . , tID_n}. Default core-class CC0 to CC3 may be mapped to all or some subset of the service processing threads. To ensure Session Initiation Protocol (SIP) or other voice traffic does not encounter latency and jitter issues due to resource sharing with other traffic, all the SIP traffic could be mapped to another Core Class e.g., CC4. CC4 could be mapped to a dedicated service processing thread and in some embodiments to multiple service processing threads. A one-to-many mapping improves efficiency and reliability. In this example, a worker ID (WID) is represented by a thread (tID), e.g., tID_k where $1<=k<=n$, is selected by a user or by default. An example mapping may be CC4→(tID1 . . . tID_k), such that service processing threads with thread IDs from 1 to k are mapped to CC4. Also, for the other traffic CC0 to CC3→all {tID_i} where $1<=i<=n$ and i !=k.

The core class and other information may be represented and communicated to other nodes in a virtual eXtensible local area network-(VXLAN) generic protocol extension (GPE). An extension may be adapted to support a particular Anchor ID 4-tuple that includes <Anchor_tID_Src, Anchor_tID_Dst, Anchor_CC_ID_Src, Anchor_CC_ID_Dst>. In another embodiment, an extension may be adapted to support a particular service processing thread 2-tuple <tID, CCID> that has a thread identifier and core class identifier.

In an active SD-WAN, there may be different flows that require different amounts of processing. Some flows may require simple services, for example simple next-generation firewall (NGFW) and SD-WAN routing services processing while other flows may require a full unified threat management (UTM) service suite. When the packets are distributed evenly without regard to the required level of processing, some workers may be over-utilized and other workers under-utilized. This can cause time-sensitive applications to suffer from latency, jitter, loss, and other performance lapses. Using core class identifiers, and thread identifiers, these time-sensitive applications can be protected from an uneven worker distribution.

As described herein, a packet flow through the SD-WAN or other network overlay environment may be anchored to a particular route for consistency across the SD-WAN or other network. In some embodiments, an in-band handshake mechanism is used to exchange service processing information of a target endpoint for traffic between a pair of endpoints, e.g. nodes, branches, hubs, controllers. In some embodiments, a perpetual in-band exchange of service processing information is used for any two endpoints involved in the SD-WAN overlay network.

Figure 6:
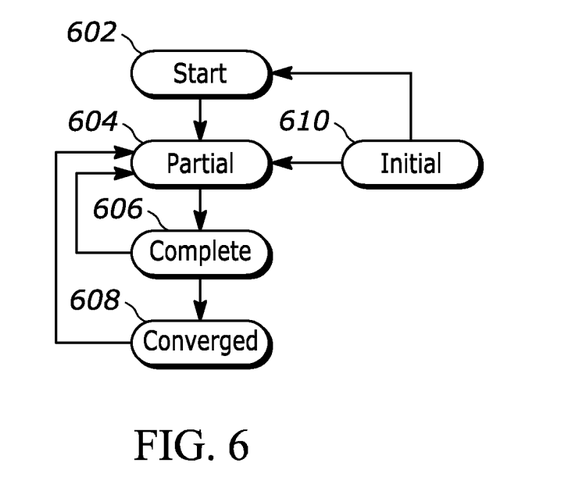
FIG. 6 is a state diagram of an example of a source branch using flow anchoring, according to embodiments herein.

FIG. 6 is a state diagram of an example of a local site using flow anchoring. FIG. 6 shows 4 states, Anchor Work Start (AWS) or START 602, Anchor Work Partial (AWP) or PARTIAL 604, Anchor Work Complete (AWC) or COMPLETE 606, and Anchor Work Converged (AWV) or CONVERGED 608. PARTIAL and COMPLETE are intermediate states. The state transition diagram may apply to a local site and a remote site for an SD-WAN or other network overlay environment flow in each direction between a pair of sites. Labels are applied as follows:

Local Site: Br_src or Source Branch of an SD-WAN
Remote Site: Br_rmt or Remote Branch of the SD-WAN
Session info for the given SD-WAN flow: S_flow
Anchor Worker ID: WID_anchor (Worker ID, Core Class)
Received state info from Br_rmt: S Br_rmt
Local state info at Br_src: S Br_src
States maintained at each site for each session: {START, PARTIAL, COMPLETE, CONVERGED}

An Anchor Worker ID (WID_anchor) is a thread ID (tID) for a worker thread of the service processing threads that is preferred by or that is being used by the sending site, either the source branch or the remote branch. It may be the same as a thread ID or it may be an identifier that is used only for workers. It serves as an identifier of a service processing thread that the sending site, whether the source branch or the remote branch is dedicating to a particular application as determined by the session information or other information available to the local site or source branch. In this example the WID_anchor also includes a Core Class value to provide QoS information about the packets that will be served by the identified service processing thread. The Core Class value may be related to the application at the end clients that generate or consume the packets. The state diagram of FIG. 6 shows a process of the source branch and the remote branch converging to a single choice of a worker for processing a sequence of packets. This process is particularly useful for a two-way flow of packets all for a particular application, especially an application that is sensitive to latency. However, it may be used in many other circumstances as well.

(START) 602 Anchor Work Start State (AW_Start): START 602 is the initial state in which the local SD-WAN site, referred to as the local site or source branch, is in a learning mode. In embodiments, all previously learnt states are purged.

In embodiments, the START state is the start of SD-WAN flow from an INITIAL state and transition to the PARTIAL state is possible. In embodiments, there is no transition back to START or INITIAL. Operation of and transitions from the START state and the other three states may be described using the terminology provided above. However, the particular indicators, such as Br_src, WID, etc., may be modified to suit any particular preference or implementation. Specific rules stated herein may also be modified or adjusted to suit different implementations. Using the above terminology, Br_src sends <WID_anchor_Br_src, AW_Start> to Br_rmt. If, at the start of SD-WAN flow, Br_rmt sends <WID_anchor_Br_rmt, AW_Start> or <WID_anchor_Br_rmt, AW_Partial>, then the Br_src moves directly from Nil→AW_Start→AW_Partial. When start mode is spinning, there are no packets received from Br_rmt and Br_src sends <WID_anchor_Br_src, AW_Start> to Br_rmt. Br_src moves from AW_Start to AW_Partial when Br_rmt sends <WID_anchor_Br_rmt, AW_Start> or <WID_anchor_Br_rmt, AW_Partial>. Upon transitioning to AW_Partial, Br_src sends <WID_anchor_Br_src, AW_Partial>. In this context, Nil→AW_Start→AW_Partial means that the state machine progresses two states ahead as a session is created on Br_src with a packet coming from the Br_rmt in the SD-WAN overlay. Information from the Br_rmt is already learnt during session creation. When a packet is received from a local LAN then the session is created at Br_src and no info is known about Br_rmt as yet, hence the state machine transitions from Nil→AW_Start.

The messages and transitions may be understood more generally. The local site begins this state from an INITIAL state 610 by sending its anchor worker ID and core class information in a packet to a remote branch (Br_rmt) in, for example, an SD-WAN protocol data unit (PDU) header of the packets. The remote branch is the destination address for a packet or a node for a session. The information may be sent as <WID_anchor_Br_src, AW_Start>, however, other formats may be used instead. In the learning mode and the START 602 state, the local site learns any remotely sent anchor worker IDs from the remote site. This information may include the anchor worker ID (worker ID, core class), and the session information from a remote site when that site is in a START or PARTIAL state. The remote site may send a packet with the anchor worker ID (worker ID, core class), and the state of the remote site. Using the conventions herein, this may be expressed as <WID_anchor_Br_rmt, AW_Start> in the packet, however, other formats may be used instead.

The information described for any of the state machine operations herein may be in a header, a wrapper, or other metadata holder. There may be additional information included in the header, wrapper or metadata not mentioned here and the data may be arranged in different configurations in any of the communications described herein. Upon sending a packet and receiving the reply, the local site (Br_src) transitions to the PARTIAL 604 state. Similarly, if the local site receives a packet with the anchor worker ID and state of the remote site as START or PARTIAL, then the local site transitions from INITIAL or START to PARTIAL before sending its anchor worker ID and state.

The local site continues to send its information in its own packet, such as the anchor worker ID and AW_Start state of the local site. This is expressed herein as <WID_anchor_Br_src, AW_Start> in the packet, however, other formats may be used instead. If no packets are received at the local site from the remote site, then the session information will remain in the START 602 state. If reverse flow packets are received from the remote site, however, then the local site makes a state transition to the PARTIAL 604 state. The test may be expressed as WID_anchor_rcvd != WID_anchor_Br_src.

(PARTIAL) 604 Anchor Work Partial State (AW_Partial): The PARTIAL 604 state is an intermediate state. In embodiments, there is a transition from the PARTIAL state only to the COMPLETE state. Every state can transition to the PARTIAL state. When the PARTIAL state is spinning, the Br_rmt sends <WID_anchor_Br_rmt, AW_Start> or <WID_anchor_Br_src, AW_Partial>. Br_src sends <WID_anchor_Br_src, AW_Partial>. Br_src transitions to AW_Complete when Br_src learns WID_anchor_Br-rmt <WID_anchor_rcvd. Upon transitioning Br_src sends <WID_anchor_Br_rmt, AW_Complete>. In this context, WID_anchor_rcvd means the learnt value reflected by Br_rmt in the data PDUs once learning is complete. If the value has been learnt correctly by Br_rmt then, when a packet is received at Br_src, WID_anchor_rcvd W_ID_anchor_Br_src. If there is any discrepancy in learning at Br_rmt or any changes happened at Br_src, then the received value may not be the same WID_anchor_rcvd != W_ID_Br_src. This causes the state transition.

The messages and transitions may be understood more generally as in PARTIAL 604, the local site sends packets to the remote site with <WID_anchor_Br_src, AW_Partial> in, for example, an SD-WAN PDU header of the packets. The local site receives from the remote site <WID_anchor_Br_rmt, AW_Start> or <WID_anchor_Br_rmt, AW_Partial>. Based on this exchange, the local site learns the anchor worker ID for the remote branch, at which time the local site transitions to COMPLETE 606. When reverse flow packets are received from the remote site, and the remote site is now in a COMPLETE state, then the local site transitions from the PARTIAL 604 state to the COMPLETE 606 state. This may be expressed as WID_anchor_rcvd==WID-anchor_Br_src. Alternatively, if the remote site is not in the COMPLETE or CONVERGED state, then the local site stays in the PARTIAL state in learn mode. This can be expressed as WID_anchor_Br_rmt←WID_anchor_rcvd.

(COMPLETE) 606 Anchor Work Complete State (AW_Complete): The COMPLETE state is also an intermediate state and transition to the PARTIAL or CONVERGED state is possible. In embodiments, there is no spinning. Br_src transitions back to AW_Partial when Br_rmt sends <WID_anchor_Br_rmt, AW_Start>, when Br_rmt sends <WID_anchor_Br_rmt, AW_Partial>, when <WID_anchor_rcvd, AW_Converged>, or when <WID_anchor_rcvd, AW_Complete>, and when WID_anchor_rcvd!=WID_anchor_Br_src.

The messages and transitions may be understood more generally as the local site sends packets back to the remote site with the anchor worker ID (worker ID, core class), and local site state in, for example, an SD-WAN PDU header of the packets. When the local site receives the anchor worker ID and remote site state from the remote site, and if the anchor worker ID matches the local site's anchor worker ID for the packet flow then the local site transitions to the CONVERGED 608 state. Otherwise, the local site transitions back to the PARTIAL 604 state. The sent session information may be expressed as <WID_anchor_Br_rmt, AW_Complete>. The received session information may be expressed as <WID_anchor_Br_rmt, AW_Complete>. If WID_anchor_rcvd==WID_anchor_Br_src, then the local site transitions to CONVERGED 608. If not, then the local site transitions to PARTIAL 604.

(CONVERGED) 608 Anchor Work Converged State (AW_Converged): The CONVERGED state is an operational state for the communication of data through one or more services processing threads with QoS handling. When spinning, the Br_rmt sends <WID_anchor_rcvd, AW_Complete> or sends <WID_anchor_rcvd, AW_Converged> and WID_anchor_rcvd==WID_anchor_Br_src. Br_src sends <WID_anchor_Br_rmt, AW_Converged> in the next packet. The Br_src will transition back to the PARTIAL state when Br_rmt sends <WID_anchor_Br_rmt, AW_Start>, when Br_rmt sends <WID_anchor_Br_rmt, AW_Partial> or when <WID_anchor_rcvd, AW_Converged>, or when <WID_anchor_rcvd, AW_Complete>, and WID_anchor_rcvd!=WID_anchor_Br_src. These are also the conditions for a transition from the COMPLETE state to the PARTIAL state.

The messages and transitions may be understood more generally as once converged, if the local site receives an anchor worker ID (worker ID, core class) and CONVERGED 608 state from the remote site in, for example, an SD-WAN protocol data unit (PDU) header of the packets. Then the local site remains in the CONVERGED 608 state and sends the same anchor worker ID and CONVERGED 608 state to the remote site in, for example its own PDU headers. For received packets from the remote site, if the local anchor worker ID matches with that of the learnt info at the remote site but the remote site is in the START 602 or PARTIAL 604 state, then the local site moves back to the PARTIAL 604 state with the learn mode to relearn the session information. The session information sent from the local site may be expressed as <WID_anchor_Br_rmt, AW_Converged>. The packets from the remote site are tested as expressed by WID_anchor_rcvd !=WID_anchor_Br_src. The session to be relearned may be expressed as WID_anchor_Br_rmt←WID_anchor_rcvd.

Figure 7:
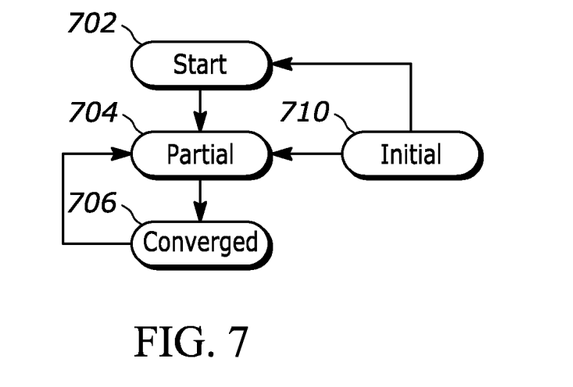
FIG. 7 is a state diagram of an alternative example of a source branch using flow anchoring, according to embodiments herein.

FIG. 7 is a state diagram for an alternative example of a local site using flow anchoring. FIG. 7 shows 3 states, START 702, PARTIAL 704, and CONVERGED 706, where PARTIAL 704 is an intermediate state. The state transition diagram may apply to a local site and a remote site for an SD-WAN flow in each direction between a pair of sites. States are maintained locally at each site, however unlike the example of FIG. 6, in this embodiment states are not exchanged between the local and the remote site. The labels are the same as in FIG. 6:

(START) 702 Anchor Work Start State: The START 702 state is arrived at from an INITIAL 710 state. In embodiments, the START state is the start of SD-WAN flow from an INITIAL state and transition to the PARTIAL state is possible. In embodiments, there is no transition back to START or INITIAL. Using the labels or terminology above, the operations of and transitions from each of the states may be described as follows. The Br_src sends <WID_anchor_Br_src, CRC_5tuple_Hash> to Br_rmt. If, at the start of SD-WAN flow, Br_rmt sends <WID_anchor_Br_rmt, AW_Start> or <WID_anchor_Br_rmt, AW_Partial>, then the Br_src moves directly from Nil→AW_Start→AW_Partial. When start mode is spinning, there are no packets received from Br_rmt and Br_src sends <WID_anchor_Br_src, CRC_5tuple_Hash> to Br_rmt. Br_src moves from AW_Start to AW_Partial when Br_rmt sends <WID_anchor_Br_rmt, CRC_5tuple_Hash>. In this context, CRC_5tuple_Hash means a Cyclic Redundancy Code (CRC) hash of the 5-tuple which contains <src-ip, dst-ip, protocol, src-port, dst-port>

This may be described more generally. Upon initiation, the local site sends its source anchor worker ID to the remote site and then transitions to the START 702 state. If the local site receives an anchor worker ID from the remote site, then it may immediately transition to the PARTIAL 704 state. In the START 702 state the local site is in a learning mode. All of the previously learnt state is purged. In this mode the local site learns any remotely sent anchor worker IDs from the remote site for session information. The messages may be labeled as WID_anchor_rcvd. In addition, the local site sends its own anchor worker ID (worker ID, core class) and session information to the remote site in, for example, an SD-WAN PDU header of the packets. In embodiments, the packet includes <WID_anchor_Br_src, CRC_5tuple_Hash>. If the local site does not receive any packets from the remote site, then the local site remains in the START 702 state. If reverse flow packets are seen from the remote site then the local site transitions to the PARTIAL 704 state.

(PARTIAL) 704 Anchor Work Partial State: The PARTIAL 704 state is an intermediate state. In embodiments, there is a transition from the PARTIAL state only to the CONVERGED state. Both states can transition to the PARTIAL state. When the PARTIAL state is spinning, the Br_rmt sends <WID_anchor_Br_rmt, CRC_5tuple_Hash>. Br_src transitions to AW_Converged when Br_src learns WID_anchor_Br_rmt for the SD-WAN flow. Br_src sends <WID_anchor_Br_src, WID_anchor_Br_rmt> and Br_rmt sends <WID_anchor_Br_rmt, WID_anchor_rcvd>.

The messages and transitions may be understood more generally as when reverse flow packets are received from the remote site in, for example, an SD-WAN PDU header of the packets, the content is analyzed to compare the anchor worker ID of the remote site and the local site. If they are the same, then the local site transitions to the CONVERGED state. If the anchor worker ID of the remote site is different, then the local site stays in the PARTIAL state and enters a learning mode. In the learning mode, the local site continues to send packets with its anchor worker ID and checks the anchor worker ID of packets that are received from the remote site. The local site is sending a hint regarding the anchor worker ID, as WID_anchor_Br_rmt. The packets and messages may be described as the local site sending packets to the remote site with an anchor worker ID hint <WID_anchor_Br_src, WID_anchor_Br_rmt> and as receiving <WID_anchor_Br_rmt, WID_anchor_rcvd>. The test may be described as WID_anchor_rcvd WID_anchor_Br_src. If the test is satisfied then the local site goes to the CONVERGED 706 state and if not, then the local site remains in the PARTIAL 704 state.

(CONVERGED) 706 Anchor Work Converged State: In the CONVERGED 706 state the local site and the remote site have converged. The CONVERGED state is an operational state for the communication of data through one or more services processing threads with QoS handling. When spinning, the Br_rmt sends <WID_Br_rmt, WID_anchor_rcvd>. The Br_src sends <WID_Br_src, WID_Br_rmt>. The Br_src will transition back to the PARTIAL state when Br_rmt sends <WID_anchor_Br_rmt, CRC_5tuple_Hash>, or when Br_rmt sends <WID_anchor_Br_rmt, WID_anchor_rcvd>, and when WID_anchor_rcvd!=WID_anchor_Br_src.

The messages and transitions may be understood more generally as the local site will send a packet to the remote site indicating that the two sites have converged to the same anchor worker ID. This may be expressed as <WID_anchor_Br_src, WID_anchor_Br_rmt>. The remote site sends a reciprocal packet with a corresponding hint which may be expressed as <WID_anchor_Br_rmt, WID_anchor_rcvd>. When the anchor worker IDs match, the local and remote site remain in the CONVERGED 706 state.

When the anchor worker IDs do not match, the local site returns to the PARTIAL 704 state. This test may be expressed as WID_anchor_rcvd !=WID_anchor_Br_src, in which the session information may be expressed as WID_anchor_Br_rmt←WID_anchor_rcvd.

Figure 8:
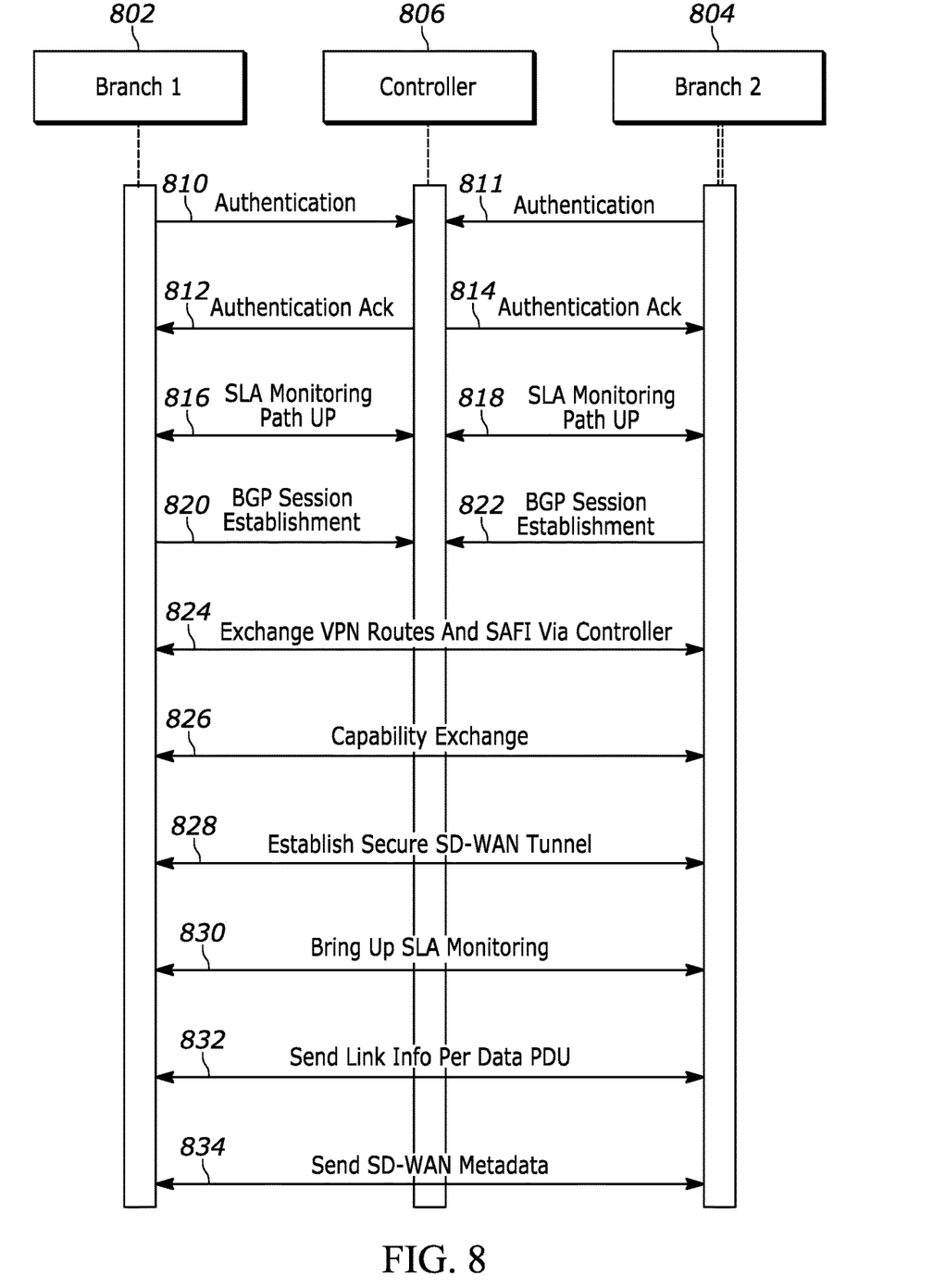
FIG. 8 is a message sequence diagram of establishing an SD-WAN overlay and capabilities for application pinning and anchoring flow through a controller, according to embodiments herein.

FIG. 8 is a message sequence diagram of establishing an SD-WAN overlay and capabilities for application pinning and anchoring flow through a controller. Information may be collected to generate and maintain system information in Multi-Protocol Border Gateway Protocol (MP-BGP), such as service processing worker threads for peer branches and masks at each branch. This information may be sent in data Protocol Data Units (PDU) in, for example, Protocol Extension packets of various kinds, including generic protocol extension (GPE). A capability exchange allows the controller to send and receive site-lists and other information. It may also allow SD-WAN flow and other auxiliary information to be exchanged using Type Length Values (TLV), Address Family Indicators (AFI), SAFI (Subsequent AFI), or other fields in MP-BGP messages.

As shown, a controller 806 is in communication with multiple branches, a first branch 802 and a second branch 804. Only two branches are shown but there may be many more. A first branch 802 sends an authentication request 810 to the controller 806 and a second branch 804 also sends an authentication request 811 to the controller 806. These requests may include key exchanges, policy exchanges, key management protocols and other information. The controller acknowledges the authentication with an acknowledgment message 812 to the first branch 802 and an acknowledgment message 814 to the second branch 804. Additional NAT (Network Address Translation) security parameters and payload configuration information may also be exchanged. Service Level Agreement (SLA) monitoring is configured as UP with a further message exchange 816 with the first branch 802 and a further message exchange 818 with the second branch 804. A session may then be established with session and connection establishment messages 820, 822 between the first branch 802 and the second branch 804.

The branches may then exchange virtual private network (VPN) routes, AFI, SAFI and other information at 824. A capability exchange may be performed at 826. The capability exchange may include virtual LAN information, flow identifiers, worker thread IDs, and other information. A secure tunnel may then be established at 828. Using the secure tunnel, SLA monitoring may be established at 830 and link information may be sent in respective data PDUs at 832.

After the SD-WAN overlay establishment and capability exchange, TLV information may be exchanged at 834 to support the application pinning and flow anchoring described herein and with respect to the state diagrams above. This SD-WAN metadata information may be included in PDU header information and may include anchor worker IDs and site state. In some embodiments a TLV may be sent in the form of <WID_anchor_Br_src, AW_Start> or any other state such as Partial, Complete or Converged. Another explicit exchange may be in the form of <WID_anchor_Br_rmt, AW_Start>. As indicated, the WID_anchor provides the worker ID and the Core Class. There may be additional TLVs in the same or another header such as CC_src and CC_dst to indicate the core class without the worker ID. The branches may combine the received worker thread, Core Class, and state information to improve flow and efficiency to the destination node within the connected SD-WAN topology. Using this information, each branch 802, 804 is able to determine a consistent worker thread and flow for any data sent by a respective branch.

The above-described exchange of worker ID and Core Class may be done after the capability exchange at 826. In some embodiments, the exchange is done when all intermediate and leaf nodes support corresponding headers. In some embodiments, the headers in a data PDU for all nodes end-to-end in a given flow would include the anchor worker ID from the source node, the anchor worker ID for the destination node. This will include both the worker ID and the Core Class ID for the source node and the destination node. In some embodiments this is carried in a VXLAN GPE, as an Anchor Worker ID 4-tuple that includes <Anchor_tID_Src, Anchor_tID_Dst, Anchor_CC_ID_Src, Anchor_CC_ID_Dst>. In some embodiments, this is represented in a 2-tuple as <WID_anchor_Br_src, AW_Start> or <WID_anchor_Br_rmt, AW_Start>.

Figure 9:
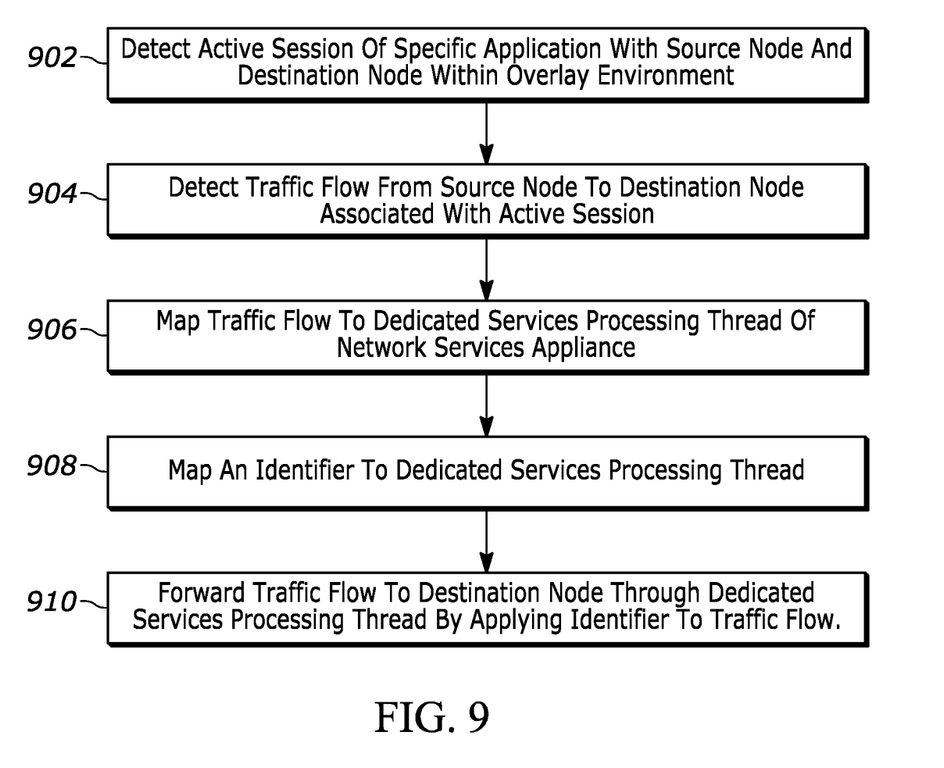
FIG. 9 is a process flow diagram of mapping traffic flow to a dedicated service processing thread, according to embodiments herein.

FIG. 9 is a process flow diagram of mapping traffic flow to a dedicated service processing thread. At 902, the local site or a controller detects an active session, i.e., an active data plane session, of a specific application with the source node and a destination node within an overlay environment, such as an SD-WAN. The local site may be an edge node, branch node, or hub. An example of the local site is the source branch referred to above. The local site may establish the session through a hub or directly with another branch by exchanging capabilities and path metrics and establishing a secure tunnel. The specific application may be a voice application, where the traffic flow comprises audio packets or a video application, where the traffic flow comprises video packets or another application that is sensitive to latency or has a high importance or urgency.

At 904, the local site detects traffic flow from the source node to the destination node that is associated with the active session. At 906, the local site maps traffic flow to a dedicated service processing thread of a network services appliance. At 908, the local site maps an identifier to the dedicated service processing thread. The identifier may be a thread ID, tID, an anchor worker ID, anchor WID, or any other suitable identifier to uniquely identify a worker for a service of a service processing core. The identifier may also include a Core Class value that is forwarded with the thread ID in a generic protocol extension of a header, such as a virtual eXtensibe local area network generic protocol extension used in an SD-WAN. A Core Class identifier may be sent together with a thread identifier as the identifier that is mapped to the dedicated service processing thread.

At 910, the local site forwards the traffic flow to the destination node through the dedicated service processing thread by applying the identifier to the traffic flow. The identifier may be applied by attaching it in a header. For traffic flow through the overlay environment, the traffic flow is encapsulated and the wrapper of the encapsulated traffic flow includes a header. The identifier may be included in the header so that the encapsulated packet may be easily forwarded at the services processing core.

As described in the context of FIGS. 6 and 7, there may be an exchange of information before the local site and the remote site converge on a single service processing thread and thread identifier. This exchange may include sending the identifier to the destination node and receiving the identifier from the destination node before forwarding the traffic flow. In this way, the source node and the destination node are converging the traffic flow to a learnt state between the source node and the destination node, before or during the traffic flow. This converging of the traffic flow includes pinning the traffic flow to a service processing thread in the overlay.

Figure 10:
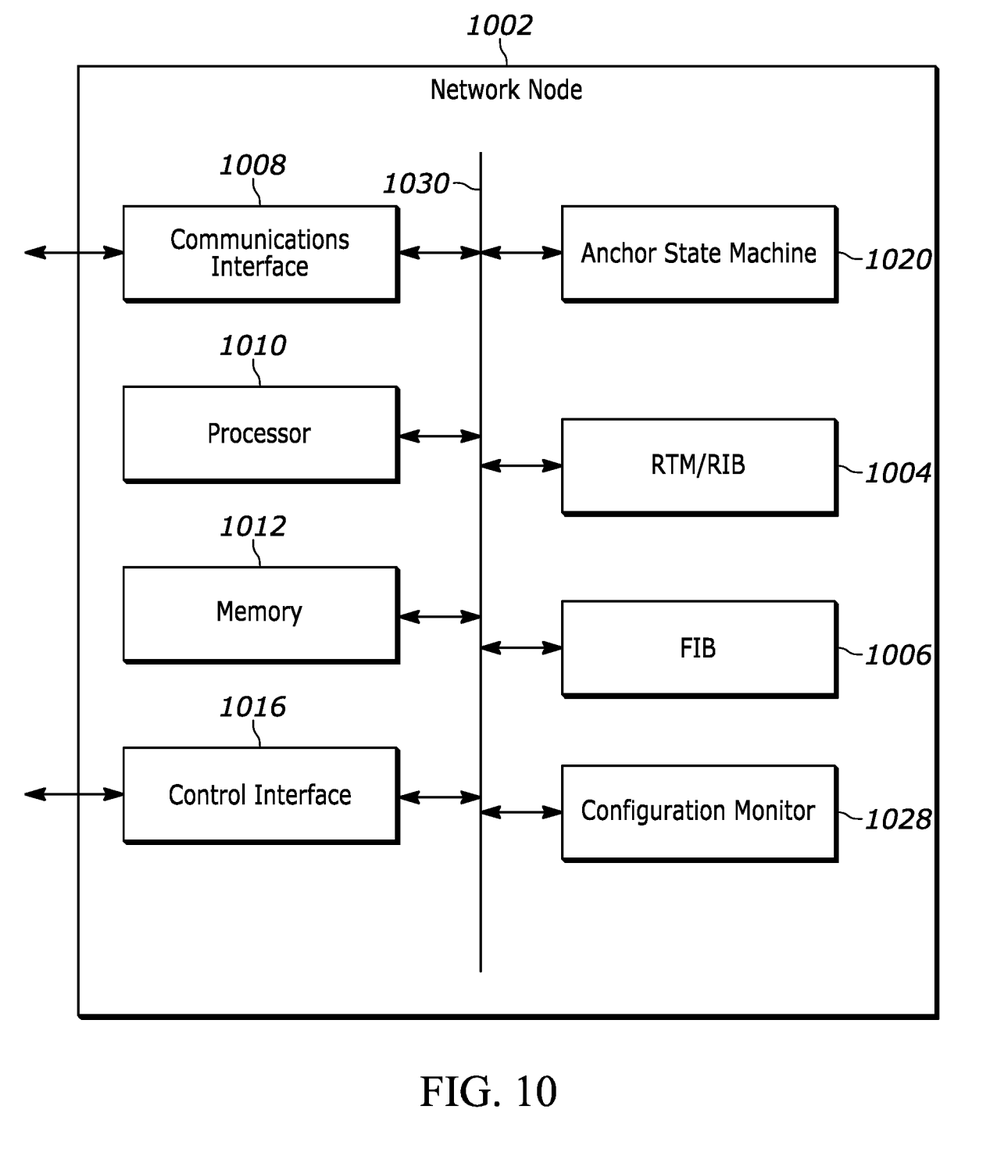
FIG. 10 is a block diagram of a node for pinning a packet flow for an application through an overlay environment, according to embodiments herein.

FIG. 10 is a block diagram of an apparatus, such as a node 1002, that communicates as a local site or as a remote site as described herein. The node may be a gateway, a source branch, a destination branch, an edge node, or a hub node, or another network node according to embodiments herein. The node includes a communications interface 1008, a processor 1010, and a memory 1012 connected together through a bus 1030. The processor 1010 may include a multifunction processor and/or an application-specific processor. The memory 1012 within the node may include, volatile and non-volatile memory for example, a non-transitory storage medium such as read only memory (ROM), flash memory, Random Access Memory (RAM), and a large capacity permanent storage device such as a hard disk drive. The communications interface 1008 enables data communications with authentication, secure tunnels, SLA metrics, route exchange, capability exchange, session establishment, etc., as described herein via local and wide area connections using one or more different protocols including Multiprotocol Border Gateway Protocol (MP-BGP), VXLAN, Multi-Protocol Label Switching (MPLS), etc. The node 1002 executes computer readable instructions stored in the storage medium of the memory 1012 to implement various tasks as described herein. The node 1002 further includes a routing table manager with a routing information base (RTM/RIB) 1004, a forwarding information base (FIB) 1006 and various other traffic caches (e.g., application cache, domain application cache, client route cache, and application route cache) to store mapping information and other traffic communication data coupled to the bus 1030.

A control interface 1016 may be provided for node management and configuration purposes as an interface to a computer monitor or flat panel display but may include any output device. In addition, the control interface 1016 may include an interface to a computer keyboard and/or pointing device such as a computer mouse, computer track pad, touch screen, etc., that allows a user to provide inputs and receive outputs including a GUI (graphical user interface). A GUI can be responsive to user inputs and typically displays images and data. The control interface 1016 can be provided as a web page served via a communication to a remote device for display to a user and for receiving inputs from the user. Additionally, each of the modules may be implemented through instructions stored on a non-transitory computer-readable storage medium. The computer-readable instructions, e.g., program instructions, are executed on a physical processor of a computing system that supports the node.

The node 1002 includes a configuration monitor 1028 to monitor policy input including BGP/OSPF (Border Gateway Protocol/Open Shortest Path First) updates, network interface state updates, and remote monitor updates, among others. The configuration monitor 1028 generates alerts or interrupts and updates backup status when there are changes to any of the monitored network node state and configurations. The configuration monitor 1028 may also maintain the RTM/RIB 1004.

The RTM/RIB 1004 may be used to generate and store routes that are outside of host routes. A BGP configuration may be maintained with information about the ESP-IP (Encryption Security Protocol-Internet Protocol) address and site identifiers of network appliances that are redistributing routes and performing services processing. Thread identifiers for pollers, load balancers, flow transmitters, and workers may be stored. In multi-hop topologies (like Spoke-Hub-Hub-Spoke), site of origin information may be used to help determine the actual originator of a prefix. Edge node and gateway node addresses may be maintained for generating headers used in encapsulating packets for tunneling.

The node further includes an anchor state machine 1020 to manage states and state transitions as described in the context of FIGS. 6 and 7. The anchor state machine 1020 works together with the configuration monitor 1028 to determine connectivity and session status and with the FIB 1006 to determine thread identifiers for anchor worker IDs and other purposes.

The embodiments disclosed herein can be implemented through at least one software program running on at least one hardware device and performing network management functions to control the network elements. The network elements shown in FIGS. 1 to 5 include blocks which can be at least one of a hardware device, or a combination of hardware device and software module.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In an embodiment, the functionality described herein is performed by a computer device that executes computer readable instructions (software). FIG. 10 depicts a node 1002 as the computer that includes the processor 1010, memory 1012, and the communications interface 1008. The processor may include a multifunction processor and/or an application-specific processor. The memory within the computer may include, for example, a non-transitory storage medium such as read only memory (ROM), flash memory, random access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method comprising:
    detecting an active session of a specific application with a source node and a destination node within an overlay environment;
    detecting a traffic flow from the source node to the destination node associated with the active session of the specific application across the overlay environment, the traffic flow having encapsulated packets with an overlay header;
    mapping the traffic flow to a dedicated service processing thread of a network services appliance, the service processing thread being to serve the specific application and being between the source node and the destination node;
    mapping an identifier to the dedicated service processing thread; and
    forwarding the traffic flow from the source node to the destination node through the dedicated service processing thread by applying the identifier and a site state of the source node as type length values (TLVs) to the traffic flow in addition to the destination node in the overlay header, wherein the site state indicates a process of the source node converging to a single choice of a dedicated service processing thread with the destination node.

2. The method of claim 1, further comprising sending the identifier to the destination node and receiving the identifier from the destination node as a TLV with a site state of the destination node before forwarding the traffic flow.

3. The method of claim 1, further comprising attaching the identifier to the traffic flow before forwarding the traffic flow to the destination node.

4. The method of claim 1, wherein the identifier includes a core class value of a generic protocol extension of the overlay header.

5. The method of claim 1, wherein the overlay environment is a software-defined wide area network (SD-WAN), wherein the traffic flow is encapsulated with a generic protocol extension for the SD-WAN, and wherein the identifier is in the generic protocol extension.

6. The method of claim 1, wherein forwarding the traffic flow is performed after receiving the identifier from the destination node.

7. The method of claim 5, wherein the generic protocol extension includes the identifier sent to the destination node and the identifier received from the destination node.

8. The method of claim 1, wherein the destination node is a remote branch.

9. The method of claim 1, wherein sending the identifier is performed at a source branch.

10. The method of claim 1, wherein the specific application is a voice application and the traffic flow comprises audio packets.

11. The method of claim 1, further comprising converging the site state of the source node and a site state of the destination node for the traffic flow to a learnt state between the source node and the destination node.

12. The method of claim 11, wherein converging the traffic flow comprises pinning the traffic flow to an SD-WAN overlay.

13. A non-transitory computer-readable storage medium containing program instructions, wherein execution of the program instructions by the computer causes the computer to perform operations comprising:
    detecting a traffic flow from the source node to the destination node associated with the active session of the specific application across the overlay environment, the traffic flow having encapsulated packets with an overlay header;
    mapping the traffic flow to a dedicated service processing thread of a network services appliance, the service processing thread being to serve the specific application and being between the source node and the destination node;
    mapping an identifier to the dedicated service processing thread; and
    forwarding the traffic flow from the source node to the destination node through the dedicated service processing thread by applying the identifier and a site state of the source node as type length values (TLVs) to the traffic flow in addition to the destination node in the overlay header, wherein the site state indicates a process of the source node converging to a single choice of a dedicated service processing thread with the destination node.

14. The medium of claim 13, the operations further comprising sending the identifier to the destination node and receiving the identifier from the destination node as a TLV with a site state of the destination node before forwarding the traffic flow.

15. The medium of claim 13, wherein the identifier includes a quality of service class.

16. The medium of claim 15, wherein the quality of service class is in the form of a core class and wherein the identifier is in a form of a 2-tuple.

17. The medium of claim 16, wherein the 2-tuple is sent within a wrapper of an encapsulated traffic flow.

18. An apparatus comprising:
    a configuration monitor to detect an active session of a specific application with a source node and a destination node within an overlay environment;
    a control interface to detect a traffic flow from the source node to the destination node associated with the active session of the specific application across the overlay environment, the traffic flow having encapsulated packets with an overlay header;

an anchor state machine to map the traffic flow to a dedicated service processing thread of a network services appliance, and to map an identifier to the dedicated service processing thread, the service processing thread being to serve the specific application and being between the source node and the destination node; and a communications interface to forward the traffic flow from the source node to the destination node through the dedicated service processing thread by applying the identifier and a site state of the source node as type length values (TLVs) to the traffic flow in addition to the destination node in the overlay header, wherein the site state indicates a process of the source node converging to a single choice of a dedicated service processing thread with the destination node.

19. The apparatus of claim 18, wherein the apparatus is a source branch of a software-defined wide area network and the destination node is a remote branch of the software-defined wide area network.

20. The apparatus of claim 19, wherein the traffic flow is encapsulated with a generic protocol extension for the software-defined wide area network, and wherein the identifier is in the generic protocol extension.

* * * * *